(12) United States Patent
Hustava et al.

(10) Patent No.: US 12,052,100 B2
(45) Date of Patent: Jul. 30, 2024

(54) DSI3 BUS WITH ENHANCED ROBUSTNESS

(71) Applicant: SEMICONDUCTOR COMPONENTS INDUSTRIES, LLC, Phoenix, AZ (US)

(72) Inventors: Marek Hustava, Bratislava (SK); Tomas Suchy, Brno (CZ)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 432 days.

(21) Appl. No.: 17/585,531

(22) Filed: Jan. 26, 2022

(65) Prior Publication Data

US 2022/0247516 A1    Aug. 4, 2022

Related U.S. Application Data

(60) Provisional application No. 63/144,353, filed on Feb. 1, 2021.

(51) Int. Cl.
*H04L 1/08*    (2006.01)
*H04J 3/14*    (2006.01)

(52) U.S. Cl.
CPC ............... *H04L 1/08* (2013.01); *H04J 3/14* (2013.01)

(58) Field of Classification Search
CPC ............ H04L 1/08; H04L 2001/0093; H04L 1/1692; H04L 1/1829; H04L 1/1867; H04L 12/40006; H04L 2012/40273; H04J 3/14; H04J 3/1676; H04J 3/1694
See application file for complete search history.

(56) References Cited

U.S. PATENT DOCUMENTS

| | | | |
|---|---|---|---|
| 10,516,683 B2 | 12/2019 | Conner et al. | |
| 10,756,925 B2 | 8/2020 | Hustava et al. | |
| 10,771,281 B1 | 9/2020 | Suchy et al. | |
| 11,262,433 B2 | 3/2022 | Lewandowski | |
| 2009/0160461 A1* | 6/2009 | Zangl | G01D 5/24 324/684 |

(Continued)

FOREIGN PATENT DOCUMENTS

| | | |
|---|---|---|
| DE | 102012101747 B4 | 7/2016 |
| KR | 1020070044487 A | 4/2007 |

OTHER PUBLICATIONS

German language Search Report for counterpart German Patent Application No. 10 2022 102 195.5, dated Nov. 25, 2022, 8 pages.

(Continued)

*Primary Examiner* — Afshawn M Towfighi
(74) *Attorney, Agent, or Firm* — Ramey LLP

(57) ABSTRACT

Methods and devices provide for enhanced robustness via graceful packet error detection and packet retransmission. One illustrative sensing method includes: generating a voltage pulse on a signal conductor coupled to a sensor array including one or more active sensors, the voltage pulse representing a broadcast read command (BRC) that defines a frame of one or more time-division-multiple-access (TDMA) slots, one slot for each active sensor to send a data packet; performing current sensing on the signal conductor to receive the data packet from each of the one or more active sensors; determining whether each said data packet is received error free; and requesting retransmission of each said data packet not received error free.

23 Claims, 5 Drawing Sheets

(56) References Cited

U.S. PATENT DOCUMENTS

| | | | |
|---|---|---|---|
| 2011/0289248 A1* | 11/2011 | Djabbari | G06F 13/4256 |
| | | | 710/110 |
| 2020/0103254 A1* | 4/2020 | Poezart | H04L 67/12 |
| 2020/0176976 A1* | 6/2020 | Lewandowski | G06F 13/40 |
| 2020/0241130 A1* | 7/2020 | Lewandowski | H04L 12/40013 |
| 2020/0249312 A1* | 8/2020 | Lewandowski | H04Q 9/04 |
| 2020/0290633 A1* | 9/2020 | Nishikawa | B60W 50/045 |

OTHER PUBLICATIONS

Denso Corporation, Freescale Semiconductor Inc. and TRW Automotive Inc., DSI3 Bus Standard Revision 1.0, Feb. 16, 2011, 45 pages.

\* cited by examiner

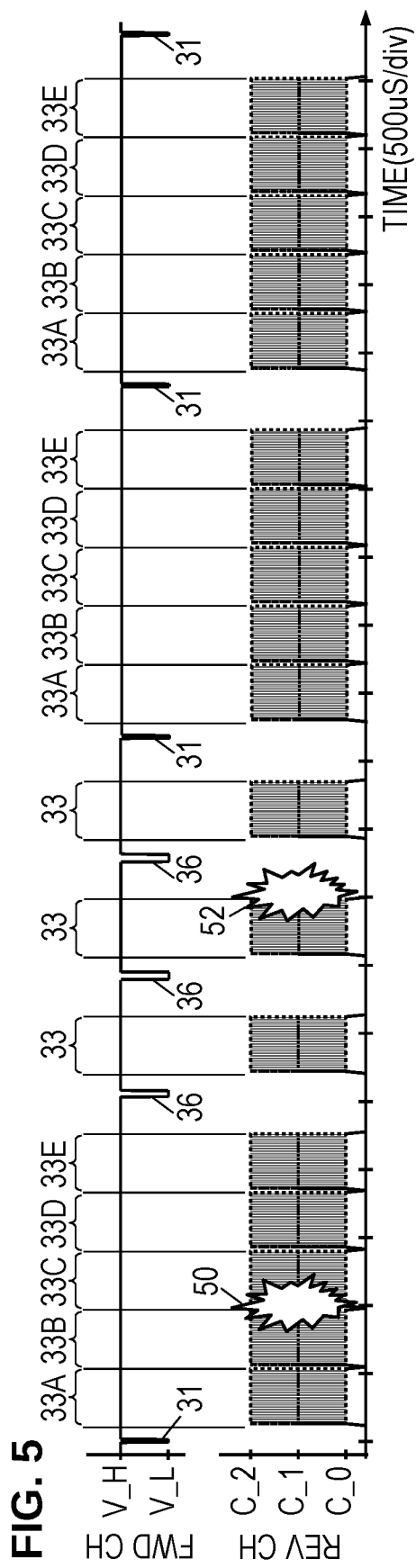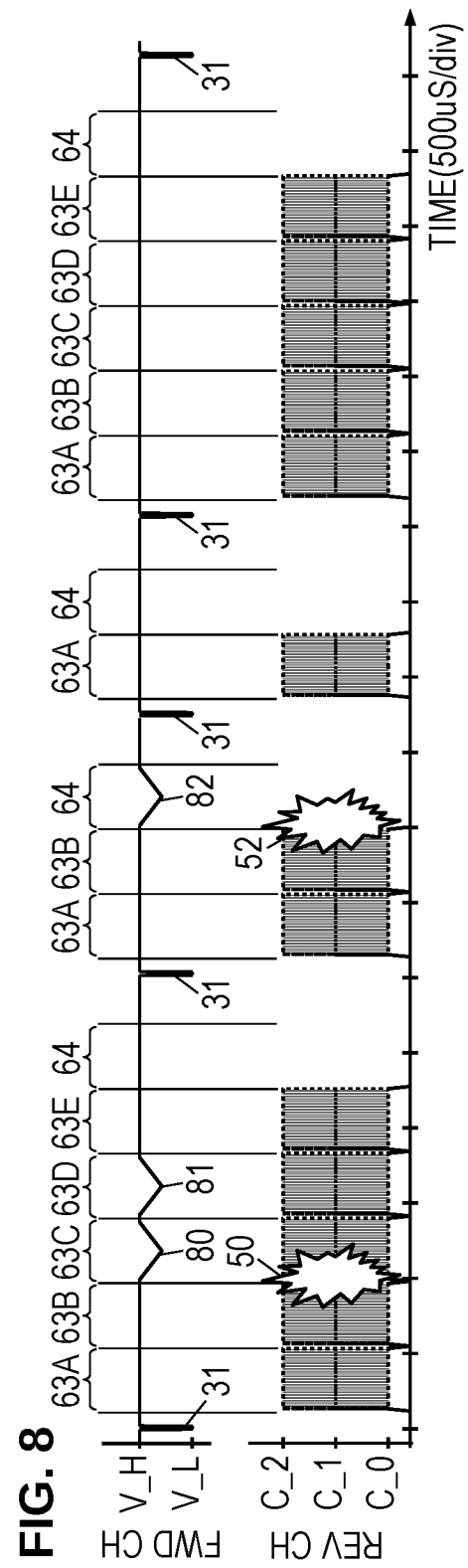

DSI3 BUS WITH ENHANCED ROBUSTNESS

CROSS-REFERENCE TO RELATED APPLICATIONS

The present application claims benefit of provisional U.S. App. 63/144,353, filed 2021 Feb. 1 and titled "Robust data transmission" by inventors Marek Hustava and Tomas Suchy. This provisional is hereby incorporated herein by reference.

BACKGROUND

Current and future vehicles are incorporating increasing numbers of on-board sensors and systems to enable or aid critical vehicle functions including Adaptive Cruise Control (ACC), Parking Assistance, Forward Collision Warning (FCW), Forward Collision with Active Braking, Blind Spot Warning (BSW), Lane Keeping Systems (LKS), and others. These technologies provide direct driver assistance in normal driving and critical scenarios, and some are even capable of enhancing driver control or providing autonomous control to prevent or mitigate a crash or negative outcome.

To accommodate the many sensors, actuators, and control systems being employed for such features, manufacturers are implementing increasingly sophisticated data communication networks in each vehicle. The 3rd generation Distributed System Interface (DSI3) standard published by the DSI Consortium (dsiconsortium.org) provides one example of such a communication network.

DSI3 and other communication standards must contend with a unique set of circumstances that challenge their performance. The networks are portable, battery powered (i.e., low voltage), with wire runs long enough to cause (and be susceptible to) electromagnetic interference (EMI). The networks should be resistant to vibration effects, yet remain inexpensive and easy to repair. The DSI3 standard has thrived by offering a number of desirable features including single-conductor communication with optionally integrated power delivery. However, the signal conductor is unshielded and carries a single-ended (as opposed to differential) unipolar signal. Attempts to increase the rate of data communication across the DSI3 bus's single signal conductor are being impaired by the industry's strict limits on EMI emissions.

U.S. Pat. No. 10,756,925, titled "Slave Device Enhancing Data Rate of DSI3 Bus" by M. Hustava et al., teaches certain system enhancements that reduce EMI at higher data rates, as does U.S. Pat. No. 10,771,281, titled "Semi-differential signaling for DSI3 bus enhancement" by T. Suchy et al. These patents are hereby incorporated herein by reference in their entireties. Even when such enhancements are used, communications over the DSI3 bus may not be sufficiently robust under all circumstances.

SUMMARY

Accordingly, there are disclosed herein sensing and communication methods and devices that provide for enhanced robustness via graceful packet error detection and packet retransmission. One illustrative sensing method includes: generating a voltage pulse on a signal conductor coupled to a sensor array including one or more active sensors, the voltage pulse representing a broadcast read command (BRC) that defines a frame of one or more time-division-multiple-access (TDMA) slots, one slot for each active sensor to send a data packet; performing current sensing on the signal conductor to receive the data packet from each of the one or more active sensors; determining whether each said data packet is received error free; and requesting retransmission of each said data packet not received error free.

An illustrative communication method in an active sensor includes: determining a default time division multiple access (TDMA) slot for the active sensor; detecting a voltage pulse on a signal conductor, the voltage pulse representing a broadcast read command (BRC) that defines a frame including the default TDMA slot; sending a data packet during the default TDMA slot by modulating a current on the signal conductor; listening for a retransmission request for the data packet; and resending the data packet if the retransmission request is received.

An illustrative bus master device includes: a controller that generates a voltage pulse on a signal conductor coupled to a sensor array including one or more active sensors, the voltage pulse representing a broadcast read command (BRC) that defines a frame of one or more time-division-multiple-access (TDMA) slots, one slot for each active sensor to send a data packet; and a detector that performs current sensing on the signal conductor to receive the data packet from each of the one or more active sensors, the controller determining whether each said data packet is received error free, and if not, requesting retransmission of each said data packet not received error free.

An illustrative sensor device includes: a controller that determines a default time division multiple access (TDMA) slot for the sensor device; a detector that detects a voltage pulse on a signal conductor, the voltage pulse representing a broadcast read command (BRC) that defines a frame including the default TDMA slot; and a driver that sends a data packet during the default TDMA slot by modulating a current on the signal conductor, the sensor device listening for a retransmission request for the data packet, and resending the data packet if the retransmission request is received.

Each of the foregoing embodiments may be employed separately or conjointly, and may optionally include one or more of the following features in any suitable combination: 1. the signal conductor is a Distributed System Interface (DSI) signal line coupling the sensor array to an automotive electronic control unit (ECU). 2. said requesting retransmission includes, after the frame ends, generating a voltage pulse having a width indicative of the sensor or slot for which a data packet was not received error free. 3. said requesting retransmission includes, generating for each said data packet not received error free, a voltage pulse having a width indicative of the sensor or slot for which the data packet was not received error free, the voltage pulse defining one TDMA slot for retransmission of the data packet. 4. said requesting retransmission further includes: determining whether each retransmitted data packet is received error free; and requesting a second retransmission of each retransmitted data packet not received error free. 5. said requesting retransmission includes: generating a voltage perturbation having a position within the frame, the position being indicative of indicative of the sensor or slot for which a data packet was not received error free; and after the frame ends, generating a voltage pulse representing a BRC that defines a retransmission slot for the data packet not received error free. 6. said requesting retransmission includes: generating, for each said data packet not received error free, a voltage perturbation having a position within the frame, each said position being indicative of indicative of the sensor or slot for which the data packet was not received error free; and after the frame ends, generating a voltage pulse representing a BRC that defines a retransmission frame of one or more TDMA slots, one slot for retransmission of each data packet not received error free. 7. said requesting retransmission further includes: determining whether each retransmitted data packet is received error free; and requesting a second retransmission of each retransmitted data packet not received error free. 8. said requesting retransmission includes, for each said data packet not received error free, sending a command and response mode (CRM) command to the sensor for which the data packet was not received error free, the CRM command defining a slot for retransmission of the data packet. 9. said listening for a retransmission request includes, after the frame ends, detecting a voltage pulse having a width indicative of the default TDMA slot. 10. said listening for a retransmission request includes: detecting a voltage perturbation having a position within the frame, the position being indicative of indicative of the default TDMA slot; and after the frame ends, detecting another voltage pulse representing a BRC that defines a retransmission slot for the data packet.

BRIEF DESCRIPTION OF THE DRAWINGS

FIG. 5 is a graph showing series of frames using the first syntax.
FIG. 8 is a graph showing a series of frames using the second syntax.

DETAILED DESCRIPTION

The attached drawings and following description set out particular embodiments and details for explanatory purposes, but It should be understood that the drawings and corresponding detailed description do not limit the disclosure. On the contrary, they provide a foundation that, together with the understanding of one of ordinary skill in the art, discloses and enables all modifications, equivalents, and alternatives falling within the scope of the appended claims.

Figure 1:
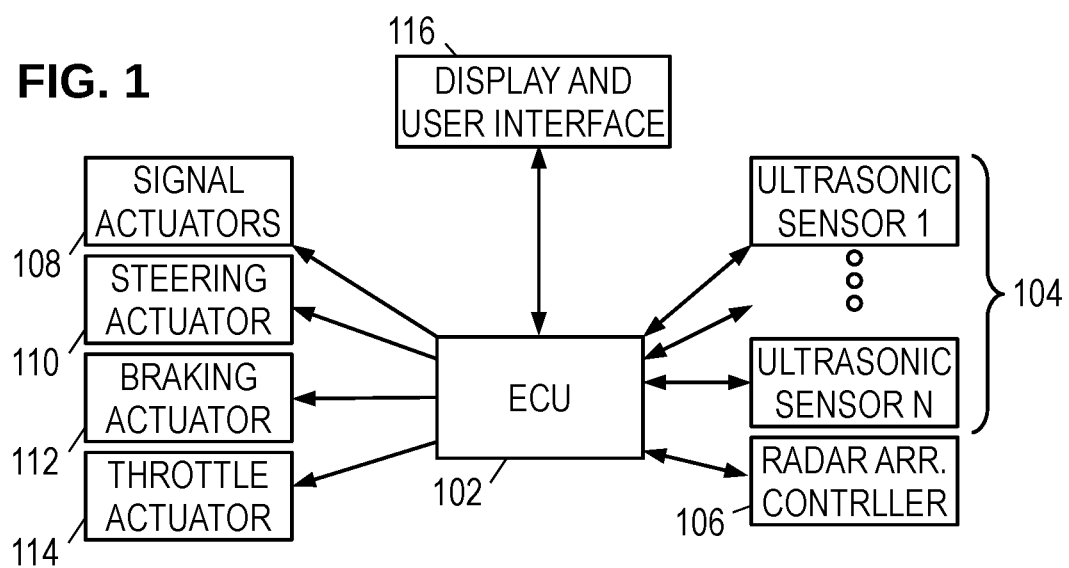
FIG. 1 is a block diagram of an illustrative data communication network.

FIG. 1 shows an electronic control unit (ECU) 102 coupled to the various ultrasonic sensors 104 and a radar array controller 106 as the center of a star topology. Of course, other topologies including serial, parallel, and hierarchical (tree) topologies, are also suitable and contemplated for use in accordance with the principles disclosed herein. The radar array controller 106 couples to the transmit and receive antennas in the radar antenna array to transmit electromagnetic waves, receive reflections, and determine a spatial relationship of the vehicle to its surroundings. The ECU 102 coordinates the radar array measurements with the ultrasonic sensor array measurements to map the near and far surroundings of the vehicle. To provide automated parking, assisted parking, lane-change assistance, obstacle and blind-spot detection, autonomous driving, and other desirable features, the ECU 102 may further connect to a set of actuators such as a turn-signal actuator 108, a steering actuator 110, a braking actuator 112, and throttle actuator 114. ECU 102 may further couple to a user-interactive interface 116 to accept user input and provide a display of the various measurements and system status.

Various standards exist to support communications between the ECU 102 and the various sensors and actuators. Of particular interest with respect to the present disclosure is the 3rd generation Distributed System Interface (DSI3) bus standard, which provides for half-duplex single-ended signal communication between a bus master device (typically the ECU) and one or more slave devices (e.g., the sensors and actuators). Because the DSI3 bus requires only one signal conductor, it may at times be referred to as a "one-wire" bus.

Figure 2A:
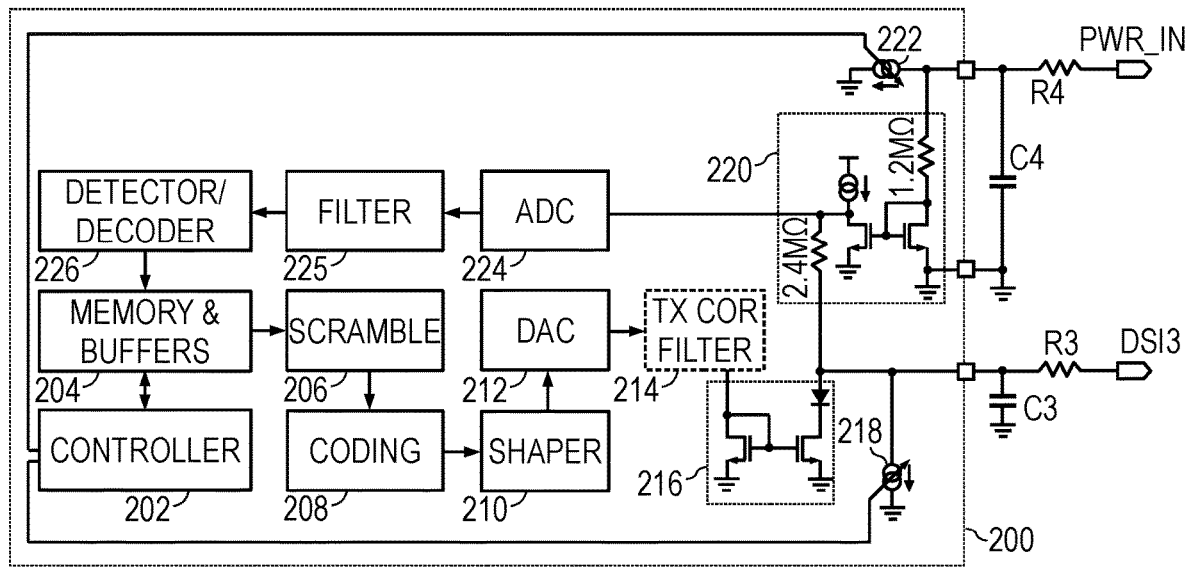
FIG. 2A is a block diagram of an illustrative slave device for a DSI3 bus.

FIG. 2A is a block diagram of an illustrative slave device 200 suitable for use on a standard DSI3 bus with parallel or point-to-point connection of the slave devices to the master device. While maintaining physical compatibility with the DSI3 standard, the illustrative device 200 includes certain features to enhance communications performance, at least some of which extend the standard in a way that may necessitate a firmware adjustment in the bus master device as discussed further below. Other features can be employed to enhance performance without departing from full compatibility with the existing standard. In addition to those features disclosed in co-owned U.S. Pat. No. 10,756,925 ("Slave Device Enhancing Data Rate of DSI3 Bus") and U.S. Pat. No. 10,771,281 ("Semi-differential signaling for DSI3 bus enhancement"), there are herein disclosed certain packet retransmission request features to further enhance the communications performance of the bus. These features can be employed individually or in various combinations.

Slave device 200 includes a controller 202 that collects measurements and buffers relevant messages in memory 204 for communicating the measurement data to the bus master device. While the message length can be varied, in at least one contemplated embodiment each message is 16 bytes and may begin with or be preceded by a preamble that is one or two nibbles in length. A scrambler 206 masks each message with a pseudorandom binary sequence using a bitwise exclusive-or (XOR) operation to randomize or "whiten" any repeating data patterns. If present, the preamble is not masked, so as to preserve the preamble pattern in the scrambler's output bitstream.

A channel encoder 208 encodes the bitstream from the scrambler 206 by mapping each nibble to a corresponding triplet of channel symbols. Each triplet includes three ternary channel symbols. Channel symbols are also referred to herein as "chips" and are transmitted as one of three unipolar non-return-to-zero levels: 0, 1, or 2, each symbol having a fixed symbol duration which may be about 3 or 4 microseconds. As provided in the standard, "0" may correspond to a quiescent channel signal current of $I_Q$. A "1" may correspond to a response channel signal current of $I_Q+I_{RESP}$, and a "2" may correspond to a response channel signal current of $I_Q+2I_{RESP}$. In at least some embodiments, $I_Q$ is limited to no more than 2 mA, and $I_{RESP}$ is approximately 12 mA. Some contemplated embodiments may switch from three-level signaling to two level signaling to improve noise immunity. In such embodiments, the channel encoder 208 maps 8-bit bytes to 8-bit codewords, in this case only $I_Q$ and $I_Q+2I_{RESP}$ current levels are used.

A pulse-shaping filter 210 may operate on the channel symbol stream from the encoder 208, providing a transfer function that converts rectangular pulses (e.g., NRZ chips) into smoother pulse shapes that provide the channel signal with more desirable spectral properties. A digital-to-analog converter 212 operates on the filtered channel signal to convert it from digital form to analog form, which herein may be termed the uplink channel signal. An optional transmit correction filter 214 may operate on the uplink channel signal to further shape the channel signal spectrum. A channel driver 216 converts the uplink channel signal into an electrical current on an input/output pin of the slave device 200. A low pass RC filter (capacitor C3, resistor R3) couples the input/output pin to the signal conductor of the DSI3 bus.

Current biasing of the input/output pin is provided by a current sink 218 and a receive buffer 220. Controller 202 adjusts the current sink 218 as needed for biasing during the forward (downlink) and reverse (uplink) communication phases of the half-duplex DSI3 communication protocol. During the downlink communication phase, the input/output pin receives a downlink channel signal in the form of an electrical voltage signal. Receive buffer 220 provides a high input impedance for the input/output pin, buffering the downlink channel signal for the analog-to-digital converter 224.

A downlink receive filter 225 may limit the digital receive signal bandwidth and/or enhance signal to noise ratio of the downlink signal. In at least some embodiments, the filter 225 operates to suppress noise above 300 kHz. In system embodiments where the master device employs a transmit correction filter (similar to filter 214 above), the downlink receive filter 225 may include a compensation function to boost downlink signal frequencies up to about 150 kHz, before rolling off to suppress noise at signal frequencies above about 250 or 300 kHz.

A symbol detector and decoder 226 operates on the filtered receive signal to determine the command type and associated payload, placing the information in the receive buffer for the controller 202 to use when formulating a response.

FIG. 2A shows both a pulse-shaping filter 210 and a transmit correction filter 214. Either or both of these filters may be omitted. The filter order can also be interchanged, with the digital-to-analog conversion occurring before, between, or after the filtering operations. As described further below, detector/decoder may be configured to detect slow variation of the input/output line voltage while other slave devices are modulating the bus current.

Figure 2B:
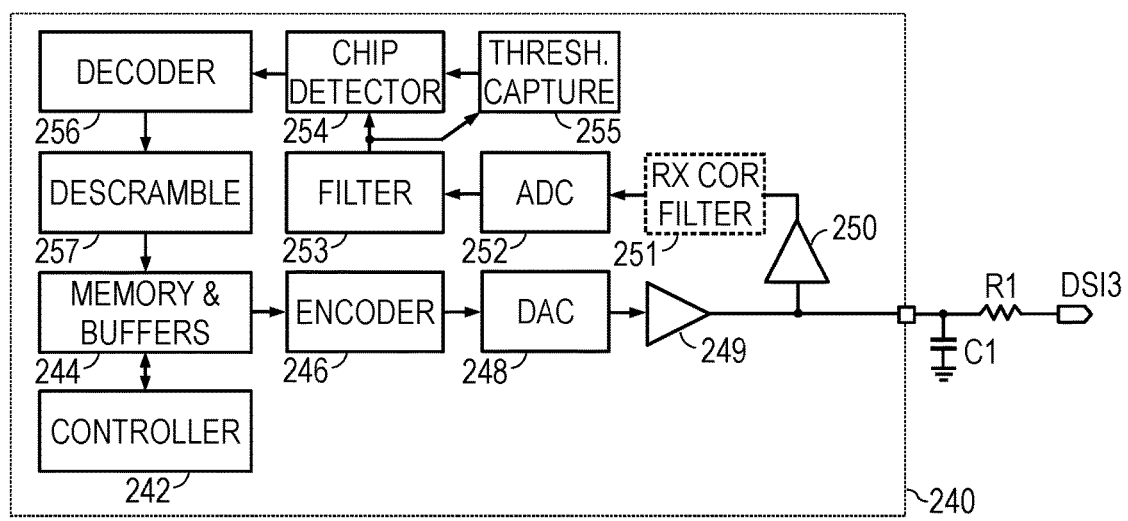
FIG. 2B is a block diagram of an illustrative master device for a DSI3 bus.

FIG. 2B is a block diagram of an illustrative bus master device 240 suitable for use on a standard DSI3 bus. As with the slave device 200, the master device 240 maintains physical compatibility with the DSI3 standard, but may include certain features to enhance uplink communication performance when employed in conjunction with a compatible slave device.

Master device 240 includes a controller 242 that formulates downlink messages in memory 244 for communication to one or more slave devices. A channel encoder 246 encodes the binary downlink messages by mapping bits 0 and 1 to upward and downward channel voltage transitions as provided by, e.g., Manchester-1 encoding. A digital-to-analog converter 248 converts the encoded signal into an analog downlink signal. A driver 249 supplies the analog downlink signal as a voltage signal to an input/output pin of the master device 240. Though the DSI3 standard provides for a 2 volt swing between "high" and "low" symbol voltages, some contemplated embodiments employ a 4 volt swing to enhance noise immunity. A low pass RC filter (capacitor C1, resistor R1) couples the input/output pin to the signal conductor of the DSI3 bus.

A high impedance receive buffer 250 couples the uplink signal from the input/output pin to an optional receive correction filter 251. The optional receive correction filter 251 may, e.g., boost high frequency content of the uplink signal to compensate for operation of the transmit correction filter 214. An analog to digital converter 252 digitizes the uplink signal, and an uplink receive filter 253 operates on the digital signal to limit signal bandwidth and/or enhance signal-to-noise ratio. Filter 253 may be a matched filter, having a filter response based at least in part on the pulse shape provided by the pulse shaping filter 210. Filters 251 and 253 can be re-ordered, merged into a single filter, and each implemented in digital or analog form.

A chip detector 254 operates on the filtered uplink signal to detect channel symbol levels. A threshold capture unit 255 may capture and/or adapt comparator threshold levels for the chip detector 254 based at least in part on the message preambles as discussed in the co-owned patents identified above. A decoder 256 operates on the channel symbol sequence from the chip detector 254, inverting the operation of encoder 208 to map the chip triplets to binary nibbles. A descrambler 257 operates on the bitstream from the decoder 256, inverting the operation of the scrambler 206 to extract the message data sent by the slave device. The message data may be stored in memory 244 for analysis and use by controller 242.

The illustrative slave device illustrated in FIG. 2A employs a channel driver 216 and receive buffer 220 that operates with reference to ground. We observe here that the ground node can drift with respect to the ground used by the master device, typically in a symmetric fashion with the drift experienced by the voltage supply nodes of the master and slave devices. (The symmetry is a result of the power supply conductor impedances on the DSI3 bus.) Consequently, a greater degree of noise immunity can be achieved if, rather than using the ground node as a reference for signal transmission and reception, the slave and master devices use a half-voltage reference as described in the co-owned patents identified above. Accordingly, at least some contemplated embodiments of the slave and master devices use a half-voltage node as the reference voltage for sending and receiving signals on the DSI3 bus.

Per the standard, DSI3 master devices communicate with slave devices in a half-duplex fashion. The bus can operate in a command and response mode (CRM), or where higher data throughputs are desired, in a periodic data collection mode (PDCM). In CRM, the bus master sends a multi-byte command word addressing a command to an individual slave device and receives a response from that device. In PDCM, the bus master sends a broadcast read command (BRC) pulse, which initiates a time division multiple access (TDMA) frame having an allocated time slot for each of the active sensors. Each active sensor responds, sending a data packet to the master during its allocated time slot.

Figure 3:
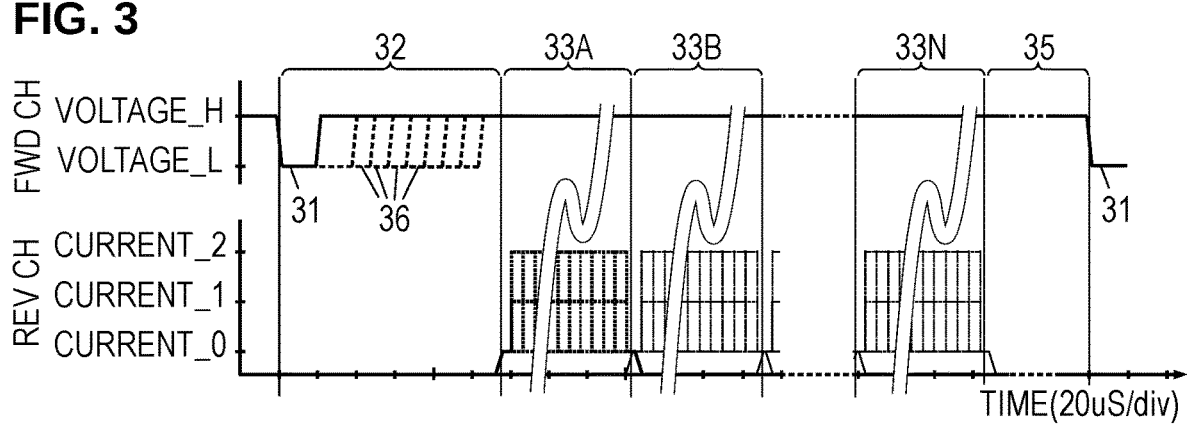
FIG. 3 is a graph of a first illustrative TDMA frame syntax.

FIG. 3 is a graph of a first illustrative TDMA frame syntax. The master device communicates to the slave devices over the forward, or "downlink", channel by modulating the voltage of the input/output signal line, and the slave devices communicate to the master device over the reverse, or "uplink", channel by modulating the current on the input/output signal line. The bus is initially in CRM, when the master device sends commands to the slave devices specifying which of the sensors will be active and the type of measurement they are to perform. Illustrative measurements include transmit and receive; and receive only ("listen"). Measurement parameters may further include frequency channels, e.g., upper sideband, lower sideband, and wideband, to enable multi-channel operation. The command may further specify the allocation of TDMA slots to the various slave devices, though it is expected that the slave devices can rely on their bus identifiers to determine their allocation, e.g., transmitting in numerical order.

The master device may then place the bus into PDCM, with a BRC pulse 31 to initiate each TDMA frame. After a programmable interval 32, which FIG. 3 shows as being measured from the falling edge of the BRC pulse but which can alternatively be measured from the rising edge, the active slave devices begin taking turns transmitting a packet containing their measurement data. In at least some systems, each sensor needs to convey multiple data packets, which would necessitate multiple TDMA frames because each sensor can only send one fixed length data packet per frame. Each TDMA slot 33A-33N contains one data packet from a corresponding sensor. The master device may delay the beginning of the next frame by a programmable interval 35.

In at least some contemplated implementations, each data packet includes a parity check, a checksum, or other form of redundancy to enable error detection. Even in implementations without such redundancy, the master device can monitor equalization error or another indicator of excessive noise to detect when a packet has not been reliably received. Upon detecting an error in a data packet or the presence of excessive noise during its reception, the master device requests retransmission of that data packet. In the illustrated syntax, the master device employs a modified BRC pulse 36 having a width indicating which slave device should retransmit (or equivalently, which data packet was unsuccessfully received or which TDMA slot provided the unsuccessful transmission).

Thus, where the default BRC pulse has a 20 microsecond duration, the master device could use a 40 microsecond width to request retransmission of the data packet from slot 33A, a 50 microsecond width to request retransmission of the data packet from slot 33B, a 60 microsecond width to request retransmission of the data packet from slot 33C, and so on up to 110 microseconds where the TDMA frame permits a maximum of eight slots.

Figure 4:
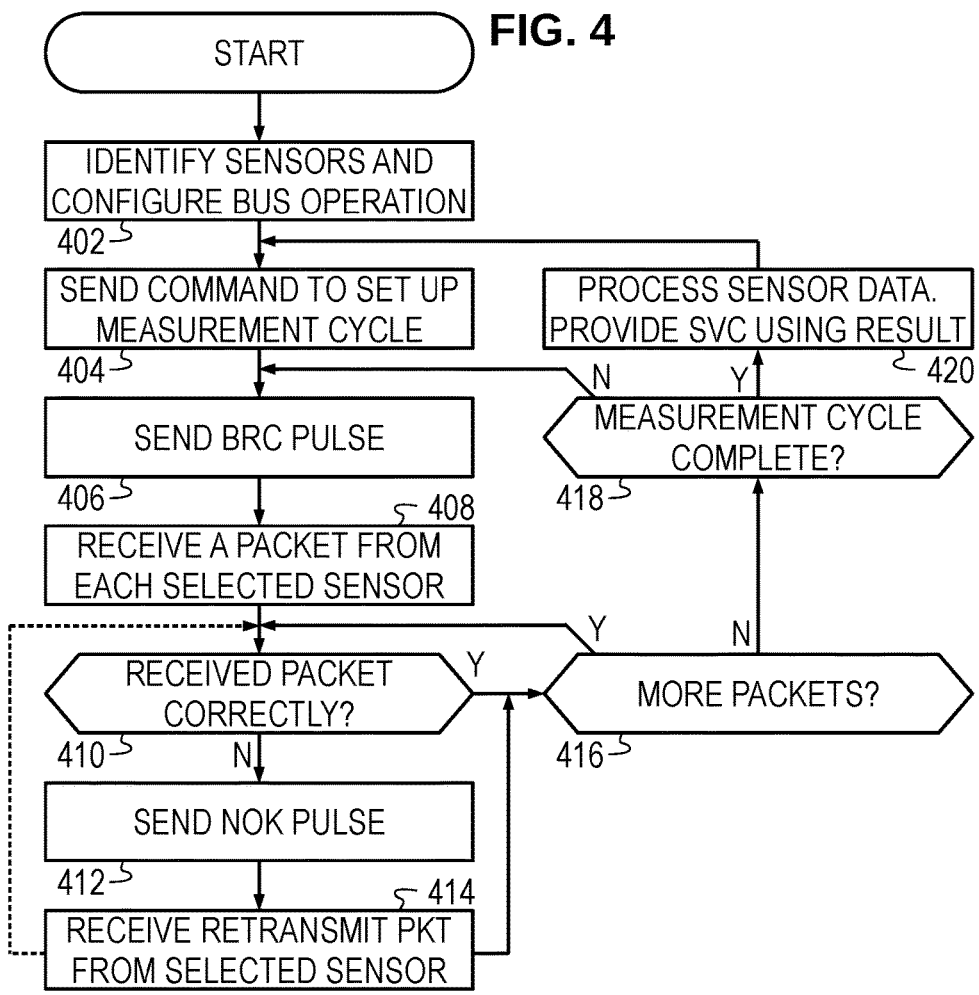
FIG. 4 is a flow diagram of an illustrative sensing method.

FIG. 4 is a flow diagram of an illustrative method that may be implemented by the master device. In block 402, the master device determines the bus configuration, identity of the slave devices, and operating parameters for the bus. In some implementations, this information may be stored in nonvolatile memory and retrieved by the device controller, while in other implementations the master device may implement a bus polling and configuration process to dynamically determine the bus configuration each time the system is powered up.

In block 404, the master device transmits one or more commands to configure the next measurement cycle. The commands select the active sensors, configuring them to perform transmit & receive measurements or listen-only measurements, with suitable channel selections if multi-channel operation is desired. Each active sensor will be assigned, or will be able to determine, its allocated TDMA slot. The sensors automatically begin acquiring their measurement data.

In block 406, the master device transmits a BRC pulse to initiate collection of the measurement data via TDMA frames. In block 408, the master device receives the data packets within a given frame and if possible extracts the relevant data, verifying it with the checksum. Blocks 410-416 represent a loop in which the master device iterates through the packets of a given TDMA frame, beginning with the first data packet.

In block 410, the master device determines whether the current data packet was received correctly. If so, control passes to block 416. Otherwise, in block 412, the master device sends a modified-width BRC pulse 36, also referred to herein as a Not OK pulse or NOK pulse 36, with the width indicating a request for retransmission of the current data packet. In block 414, the master device receives the retransmitted packet. Where the system permits multiple retransmission requests (e.g., when a retransmitted pulse gets corrupted), blocks 410-414 may be repeated until the packet is successfully received. Where only a single request is permitted, the data packet is discarded if the retransmission is unsuccessful.

In block 416, the master device determines whether all of the data packets from the current frame have been evaluated, and if not, blocks 410-416 are repeated with the next data packet. Otherwise in block 418, the master device determines whether additional TDMA frames are needed to complete data collection for the current measurement cycle, and if so, the master device sends another BRC pulse in block 406. Otherwise, in block 420, the master device processes the sensor data to, e.g., track obstacles near the vehicle, and uses the results to provide the desired driver assistance feature, e.g., assisted parking. Thereafter, the master device may initiate a new measurement cycle beginning in block 404.

FIG. 5 shows an illustrative sequence of frames from a measurement cycle. The master device initiates a TDMA frame with a BRC pulse 31, causing (in this example) five sensors to transmit data packets in TDMA slots 33A-33E. A noise burst 50 occurs, preventing the correct reception of the data packets in slots 33B and 33C. Accordingly, after the end of the frame the master device transmits a NOK pulse 36 with a width indicating that the data packet from slot 33B should be retransmitted. After the retransmitted packet is sent, the master device sends a second NOK pulse 36 with a width indicating that the data packet from slot 33C should be retransmitted. During the retransmission, a second noise burst occurs, preventing correct reception of the retransmitted data packet. The master device may then send a third NOK pulse 36 again requesting retransmission of the data packet from slot 33C. This time the retransmitted pulse is received correctly.

The master device then initiates the next TDMA frame with a BRC pulse 31. Upon detecting the BRC pulse, the sensors can release the previous data packet from their buffers, as they will not be the subject of any further retransmission requests. The next data packets are formed and transmitted during their respective TDMA slots. As all data packets are received correctly, the next frame is initiated with yet another BRC pulse 31.

Figure 6:
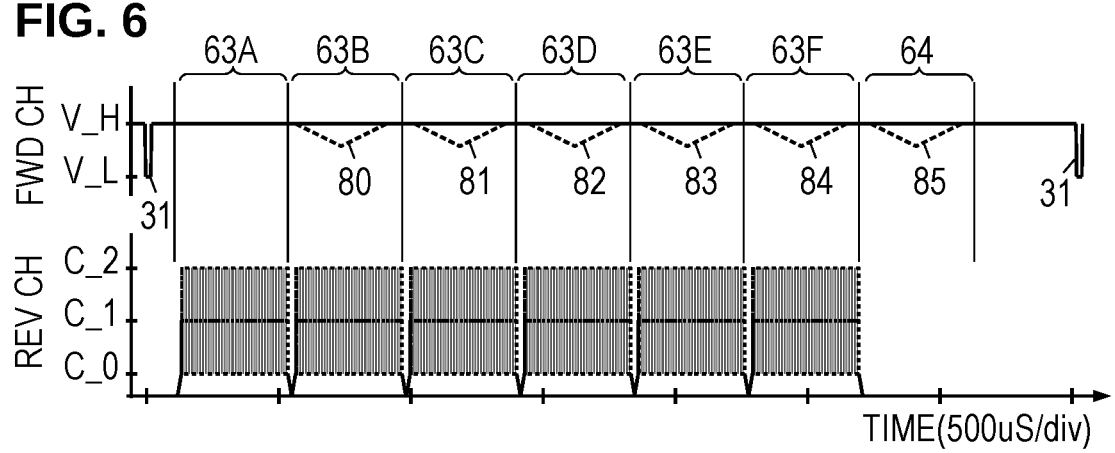
FIG. 6 is a graph of a second illustrative TDMA frame syntax.

FIG. 6 shows an alternative TDMA frame syntax. As before, the master device initiates a TDMA frame with a BRC pulse 31, from which a set of TDMA slots 63A-63F are measured. (The exact number of slots is determined by the number of active sensors.) The active sensors each transmit a data packet to the master device in their respective TDMA slot. As long as each data packet is correctly received, the master device maintains the voltage of the input/output signal line at a constant value (by default, the upper of the two voltages used by the master device to modulate a binary downlink signal). On the other hand, if a data packet is not correctly received, the master device depresses the signal line voltage during the following TDMA slot.

Thus, voltage depression 80 may be used by the master device in the second TDMA slot 63B to indicate that the data packet in the first slot 63A was not correctly received, depression 81 may be used in slot 63C to indicate that the data packet in the second slot 63B was not correctly received, and so on. After the last TDMA slot 63F, an interval 64 is provided for an optional depression 85 to indicate whether the last data packet was correctly received. If any data packets were not correctly received, the subsequent TDMA frame initiated by BRC pulse 31 is reserved for retransmission packets.

In at least some implementations, the signal line voltage is depressed by about half the difference between the two modulation voltages used by the master device. To enable the depression to be as gradual as possible, the signal line voltage may be ramped downward starting at the beginning of the next TDMA slot to a minimum at the TDMA slot midpoint and ramped upward from there to the end of the TDMA slot. As an alternative to using voltage depressions to signal incorrect reception, the master device may instead provide a sinusoidal tone in the subsequent TDMA slot at a frequency carefully chosen to minimize potential interference with the uplink channel or other components.

Figure 7:
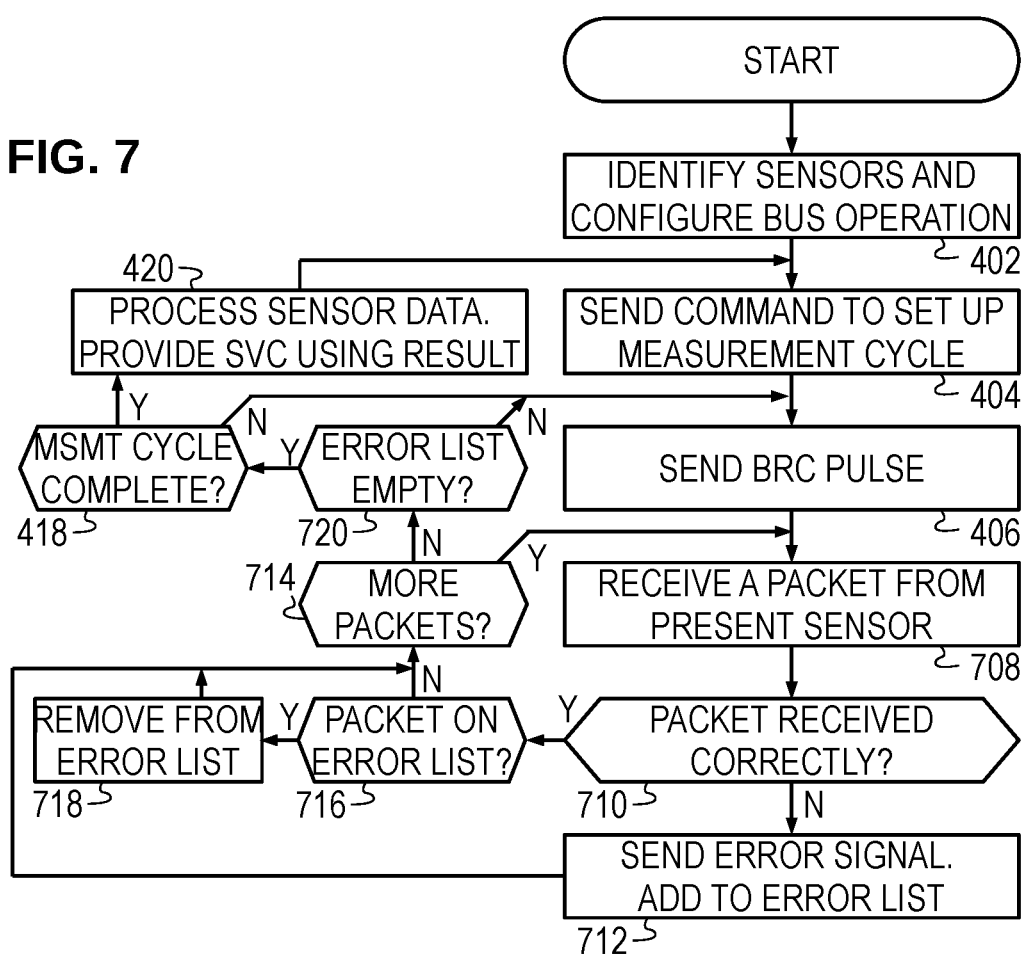
FIG. 7 is a flow diagram of an alternative sensing method.

FIG. 7 is a flow diagram of an illustrative method that may be employed by a master device using the alternative syntax. The operations in blocks 402-406 and 418-420 are as described previously. After the BRC pulse 31 is sent in block 406, the master device in block 708 receives a packet during the current TDMA slot. In block 710, the master device promptly determines whether the data packet was correctly received, e.g., by calculating a checksum of the data packet and verifying it matches the appended checksum value. If not, the master device in block 712 sends an error signal (e.g., a voltage depression or sinusoidal tone) and adds an identifier of the TDMA slot, data packet, or sensor to a list representing the data packets that have not been correctly received. In block 714, the master device determines whether more packets are expected, and if so, returns to block 708 to receive the next one.

Otherwise, if the data packet is received correctly in block 710, the master device in block 716 determines whether the correctly received packet is on the error list. If not, the master device proceeds to block 714. If it is in the error list, the master device in block 718 removes the data packet from the list due to the correct reception of the retransmitted packet. Once all packets from the current TDMA frame are determined in block 714 to have been received (correctly or incorrectly), the master device checks in block 720 to determine whether the error list is empty (all packets correctly received) or not (at least one packet retransmission desired). If the list is not empty, the master device sends a BRC pulse in block 406 to initiate a TDMA frame for retransmissions. Otherwise, the master device proceeds to block 418.

FIG. 8 shows an alternative sequence of frames from a measurement cycle. The master device initiates a TDMA frame with a BRC pulse, causing (in this example) five sensors to transmit data packets in TDMA slots 63A-63E. A noise burst 50 occurs, preventing the correct reception of the data packet in slots 63B, 63C. To signal that the data packet in slot 63B was not received correctly, the master device forms a voltage depression 80 in slot 63C. Similarly, a voltage depression 81 in slot 63D indicates that the data packet of slot 63C was not received correctly.

At the end of the TDMA frame, the master device sends a BRC pulse 31 to initiate a retransmission frame. The data packet originally from slot 63B is the first incorrectly received packet and is thus retransmitted in slot 63A. The data packet originally from slot 63C is the second incorrectly received packet and is thus retransmitted in slot 63B. However, a second noise burst 52 prevents the second retransmitted packet from being received correctly, and thus the master device forms a voltage depression 82 during interval 64. At the end of the retransmission frame, the master device sends another BRC pulse 31 to initiate a second retransmission frame. The only data packet not yet received correctly (the one originally from slot 63C) is retransmitted in slot 63A.

The master device then initiates the next TDMA frame with a BRC pulse 31. Upon detecting the BRC pulse without a preceding voltage depression, the sensors can release the previous data packet from their buffers, as they will not be the subject of any further retransmission requests. The next data packets are formed and transmitted during their respective TDMA slots. As all data packets are received correctly, the next frame is initiated with yet another BRC pulse 31.

Numerous modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A sensing method that comprises:
    generating a voltage pulse on a signal conductor coupled to a sensor array including one or more active sensors, the voltage pulse representing a broadcast read command (BRC) that defines a frame of one or more time-division-multiple-access (TDMA) slots, one slot for each active sensor to send a data packet;
    performing current sensing on the signal conductor to receive the data packet from each of the one or more active sensors;
    determining whether each said data packet is received error free; and
    requesting retransmission of each said data packet not received error free.

2. The method of claim 1, wherein the signal conductor is a Distributed System Interface (DSI) signal line coupling the sensor array to an automotive electronic control unit (ECU).

3. The method of claim 1, wherein said requesting retransmission includes, after the frame ends, generating a voltage pulse having a width indicative of the sensor or slot for which a data packet was not received error free.

4. The method of claim 1, wherein said requesting retransmission includes, generating for each said data packet not received error free, a voltage pulse having a width indicative of the sensor or slot for which the data packet was not received error free, the voltage pulse defining one TDMA slot for retransmission of the data packet.

5. The method of claim 4, wherein said requesting retransmission further includes:
    determining whether each retransmitted data packet is received error free; and
    requesting a second retransmission of each retransmitted data packet not received error free.

6. The method of claim 1, wherein said requesting retransmission includes:
    generating a voltage perturbation having a position within the frame, the position being indicative of indicative of the sensor or slot for which a data packet was not received error free; and
    after the frame ends, generating a voltage pulse representing a BRC that defines a retransmission slot for the data packet not received error free.

7. The method of claim 1, wherein said requesting retransmission includes:
  generating, for each said data packet not received error free, a voltage perturbation having a position within the frame, each said position being indicative of indicative of the sensor or slot for which the data packet was not received error free; and
  after the frame ends, generating a voltage pulse representing a BRC that defines a retransmission frame of one or more TDMA slots, one slot for retransmission of each data packet not received error free.

8. The method of claim 7, wherein said requesting retransmission further includes:
  determining whether each retransmitted data packet is received error free; and
  requesting a second retransmission of each retransmitted data packet not received error free.

9. The method of claim 1, wherein said requesting retransmission includes, for each said data packet not received error free, sending a command and response mode (CRM) command to the sensor for which the data packet was not received error free, the CRM command defining a slot for retransmission of the data packet.

10. A communication method in an active sensor, the method comprising:
  determining a default time division multiple access (TDMA) slot for the active sensor;
  detecting a voltage pulse on a signal conductor, the voltage pulse representing a broadcast read command (BRC) that defines a frame including the default TDMA slot;
  sending a data packet during the default TDMA slot by modulating a current on the signal conductor;
  listening for a retransmission request for the data packet; and
  resending the data packet if the retransmission request is received.

11. The method of claim 10, wherein the signal conductor is a Distributed System Interface (DSI) signal line coupling the active sensor to an automotive electronic control unit (ECU).

12. The method of claim 10, wherein said listening for a retransmission request includes, after the frame ends, detecting a voltage pulse having a width indicative of the default TDMA slot.

13. The method of claim 12, further comprising:
  listening for a second retransmission request after said resending; and
  providing a second retransmission of the data packet if the second retransmission request is received.

14. The method of claim 10, wherein said listening for a retransmission request includes:
  detecting a voltage perturbation having a position within the frame, the position being indicative of indicative of the default TDMA slot; and
  after the frame ends, detecting another voltage pulse representing a BRC that defines a retransmission slot for the data packet.

15. The method of claim 14, further comprising:
  listening for a second retransmission request after said resending; and
  providing a second retransmission of the data packet if the second retransmission request is received.

16. A bus master device that comprises:
  a controller that generates a voltage pulse on a signal conductor coupled to a sensor array including one or more active sensors, the voltage pulse representing a broadcast read command (BRC) that defines a frame of one or more time-division-multiple-access (TDMA) slots, one slot for each active sensor to send a data packet;
  a detector that performs current sensing on the signal conductor to receive the data packet from each of the one or more active sensors,
  the controller determining whether each said data packet is received error free, and if not, requesting retransmission of each said data packet not received error free.

17. The bus master device of claim 16, wherein the signal conductor is a Distributed System Interface (DSI) signal line coupling the sensor array to the bus master device.

18. The bus master device of claim 16, wherein said requesting retransmission includes, generating for each said data packet not received error free, a voltage pulse having a width indicative of the sensor or slot for which the data packet was not received error free, the voltage pulse defining one TDMA slot for retransmission of the data packet.

19. The bus master device of claim 16, wherein said requesting retransmission includes:
  generating, for each said data packet not received error free, a voltage perturbation having a position within the frame, each said position being indicative of indicative of the sensor or slot for which the data packet was not received error free; and
  after the frame ends, generating a voltage pulse representing a BRC that defines a retransmission frame of one or more TDMA slots, one slot for retransmission of each data packet not received error free.

20. A sensor device that comprises:
  a controller that determines a default time division multiple access (TDMA) slot for the sensor device;
  a detector that detects a voltage pulse on a signal conductor, the voltage pulse representing a broadcast read command (BRC) that defines a frame including the default TDMA slot;
  a driver that sends a data packet during the default TDMA slot by modulating a current on the signal conductor,
  the sensor device listening for a retransmission request for the data packet, and resending the data packet if the retransmission request is received.

21. The sensor device of claim 20, wherein the signal conductor is a Distributed System Interface (DSI) signal line coupling the sensor device to an automotive electronic control unit (ECU).

22. The sensor device of claim 20, wherein said listening for a retransmission request includes, after the frame ends, the detector detecting a voltage pulse having a width indicative of the default TDMA slot.

23. The sensor device of claim 20, wherein said listening for a retransmission request includes:
  the controller detecting a voltage perturbation having a position within the frame, the position being indicative of indicative of the default TDMA slot; and
  after the frame ends, the detector detecting another voltage pulse representing a BRC that defines a retransmission slot for the data packet.

* * * * *